United States Patent

[11] 3,615,171

[72] Inventors George W. Mason
    Clarendon Hills;
    Sonia Lewey; Allen F. Bollmeier, Joliet;
    Donald F. Peppard, Oak Park, all of Ill.
[21] Appl. No. 46,191
[22] Filed June 15, 1970
[45] Patented Oct. 26, 1971
[73] Assignee The United States of America as
    represented by the United States Atomic
    Energy Commission

[54] PROCESS OF SEPARATING YTTRIUM FROM LANTHANIDE RARE EARTHS
    10 Claims, 1 Drawing Fig.
[52] U.S. Cl. .................................................. 23/22,
    23/23, 23/312 ME, 23/87
[51] Int. Cl. ........................................................ C01b 59/00
[50] Field of Search ............................................ 23/15,
    18–20, 22, 23, 312 ME

[56] References Cited
    UNITED STATES PATENTS
3,110,556 11/1963 Peppard et al. ................ 23/23
3,378,352 4/1968 Hansen .......................... 23/312 ME
3,482,932 12/1969 Gump ............................. 23/22
3,514,267 5/1970 Shenington et al. ........... 23/312 ME OTHER REFERENCES
Butler et al. " Industrial & Engineering Chemistry," Vol. 53, Aug. 1961, pp. 651– 654

Primary Examiner—Herbert T. Carter
Attorney—Roland A. Anderson

ABSTRACT: Yttrium values are separated from lanthanide rare earth values which are present together as bromides in an aqueous feed solution containing excess bromide ions by extracting the lanthanide rare earth values and some of the yttrium values from the feed solution with bis-2-ethyl hexyl chloromethyl phosphonate, scrubbing the yttrium values from the extractant with an aqueous scrub solution of hydrogen bromide and lithium bromide, and separating the yttrium values from the aqueous feed and scrub solutions.

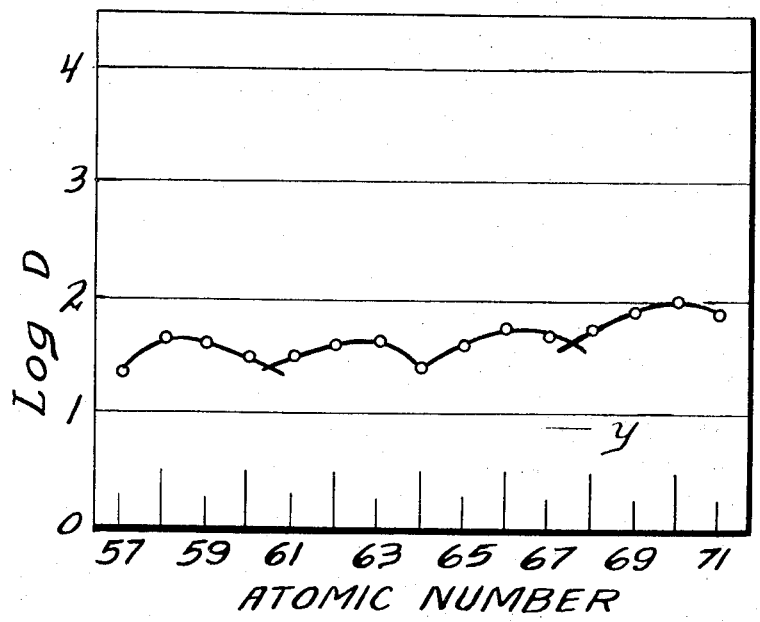

`3,615,171`

PROCESS OF SEPARATING YTTRIUM FROM LANTHANIDE RARE EARTHS

CONTRACTUAL ORIGIN OF THE INVENTION

The invention described herein was made in the course of, or under a contract with the United States Atomic Energy Commission.

BACKGROUND OF THE INVENTION

This invention deals with the recovery of yttrium values contained in aqueous solutions together with lanthanide rare earth values. Hereinafter the term "rare earth values" or "rare earth metals" is always to designate rare earths of the lanthanide group.

The demand for yttrium is constantly increasing. Because yttrium has a great affinity for hydrogen, it can be used as a getter in the manufacture of vacuum tubes. Yttrium-hydrogen compositions have good high-temperature stability characteristics and the low cross section of yttrium in addition to its high melting point makes it of interest in nuclear reactor technology.

Yttrium usually occurs in materials together with rare earths of the lanthanide group, for example in ores. Since yttrium chemically reacts very similarly to the rare earth metals, separation of it in pure rare-earths free form is rather difficult. One process for performing this separation requires the use of two separate extractants whereby the yttrium values are first extracted with the heavier rare earth metals from an aqueous feed solution, stripped from the organic extractant with an aqueous acid solution to which is then added a water-soluble thiocyanate to form a second aqueous feed solution. This second feed solution is then contacted with a second extractant by which the heavier rare earth metals are extracted away from the yttrium which remains in the aqueous feed where it may be readily recovered. This process is described in assignee's U.S. Pat. No. 3,110,556, issued Nov. 12, 1963. However, the extractability values of the elements in that process are rather close to each other so that in addition to requiring a number of steps a great many extraction and back-extraction cycles are necessary to provide a satisfactory separation.

Another process by which yttrium may be separated from the rare earths is by elution of the values from an ion exchange column with ethylenediaminetetraacetic acid whereby the yttrium and rare earth values are obtained in separate fractions of the eluent. However, this separation method is very slow and relatively expensive to use.

SUMMARY OF THE INVENTION

We have discovered that, by contacting an aqueous feed solution containing yttrium and rare earth values as their bromides with a solution of bis-2-ethyl hexyl chloromethyl phosphonate hereinafter referred to as DEH[ClMP]), it is possible to extract the major portion of the rare earth values away from the yttrium values which remain primarily in the aqueous solution. This is possible because of the unusual distribution for yttrium where the value of log K for yttrium is below the value of log K for the lanthanide rare earths in this extraction system. Log K is the logarithm of the distribution coefficient "K" which is the ratio of concentration in the organic phase: concentration in the aqueous phase. The lanthanide rare earth content of the aqueous phase may be further reduced through one or more additional extractions into a solution of DEH[ClMP]. The yttrium values which are coextracted from the aqueous feed solution with the rare earth values are scrubbed therefrom by contacting the organic extractant with an aqueous hydrogen bromide containing excess bromide ion. The scrub and feed solutions can then be combined and the yttrium values removed therefrom.

It is therefore one object of this invention to provide a process for separating yttrium values from the rare earth values with which it is normally found.

It is another object of this invention to provide a process for separating yttrium values from the rare earths which reduces the number of steps required.

It is another object of this invention to provide a process for separating yttrium values from the rare earths which is relatively fast and inexpensive.

Finally, it is the object of this invention to provide a liquid-liquid extraction process for separating yttrium values from rare earth values which is relatively inexpensive and easy to use and requires a minimum number of extractants and steps to accomplish the separation.

BRIEF DESCRIPTION OF THE DRAWING

The drawing shows the extractability of yttrium as compared with the extractability for the lanthanide rare earths.

DESCRIPTION OF THE PREFERRED EMBODIMENT

This and other objects of the invention may be attained by preparing an aqueous feed solution containing, as bromides, up to about 20 gm. of rare earth and yttrium values per liter and containing 11.0 to 11.9 M total bromide ion, contacting this feed solution with 0.1 to 1.0 F DEH[ClMP] in a water-immiscible hydrocarbon solvent to extract the rare earths present, contacting the extractant with an aqueous hydrogen bromide scrub solution which is 11.0 to 11.9 M in bromide ion to scrub any yttrium values which may have coextracted with the rare earth values and removing the yttrium values from the aqueous feed and scrub solutions.

The aqueous feed may be prepared by dissolving the rare earth and yttrium values as their bromide salts in water or by dissolving these values as soluble compounds in a solution of hydrogen bromide. The feed solution may contain up to 2.0 M hydrogen bromide, although the presence of hydrogen bromide will lower the distribution ratio. Sufficient bromide ion must be added to the feed solution so that the total ion content is from 11.0 to 11.9 M. This may be accomplished by the addition of any of the soluble bromide salts, such as lithium bromide, to the solution.

The concentration of the extractant may vary from 0.1 to 1.0 F DEH[ClMP]. ("F" is a symbol to indicate formality, which means that one liter contains as many grams of extractant as the formula indicates, disregarding any polymerization or dissociation that may take place.)

The solvent may be an aromatic water-immiscible hydrocarbon, examples of which are benzene, toluene and xylene.

The aqueous scrub solution must be from 0.1 to 2.0 M in hydrogen bromide. The hydrogen bromide is necessary to prevent the rare earth ions from hydrolyzing. Hydrogen bromide concentration also affects the metal ion distribution ratio, so that, as the hydrogen bromide concentration increases, the distribution ratio goes down. The scrub solution must also contain sufficient additional bromide salt so that the total bromide ion concentration of the solution is from 11.0 to 11.9 M. Lithium bromide is used as a source of bromide ion because it is the most soluble of the bromide salts, although any salt which would permit an adequate bromide ion concentration would be satisfactory.

Room temperature, approximately 25° C., is the preferred temperature for extraction. The two phases are usually thoroughly contacted either by stirring or shaking in a batch operation or by countercurrent flow in a column or other continuous operation. After this, the phases are allowed to settle for a few minutes and are then separated from each other by means known to those skilled in the art.

The final aqueous product solution containing the yttrium can then be further processed for recovery of the yttrium values. Precipitation with a hydroxide such as ammonia or sodium or with oxalic acid has been found satisfactory.

The following example is given as illustrative of the process of this invention and is not to be taken as limiting the scope or extent of the invention.

EXAMPLE

An aqueous feed solution was prepared containing Y, La, Pr, Gd, Dy, Ho and Er as their bromides in saturated lithium bromide. The aqueous scrub was 1.0 M in hydrogen bromide containing 10.9 M lithium bromide and the organic extractant was 0.3 F DEH[ClMP] in benzene.

A five-stage countercurrent semicontinuous extraction process was used, employing as extractors five 60-ml. separatory funnels in series. The fresh feed was introduced in the third funnel, the organic extractant in the fifth funnel and the scrub solution in the first funnel. The quantities used for feed, solvent and scrub were 0.4 ml. 8 ml. and 8 ml. respectively. The aqueous solutions or phases from each funnel were transferred to the next-following extractor, while the organic extractant or phases were transferred in each case to the next-preceding funnel. The aqueous solution leaving funnel No. 5 and the organic solution leaving funnel No. 1 were the aqueous product solution and the organic product solution, respectively. Each contact was maintained for 3 minutes and 2 minutes were allowed for settling.

Thirteen cycles (using 13 feed additions) were carried out, the first two cycles being required to charge all funnels. Eleven organic and 11 aqueous product solutions were obtained.

For analysis of the organic product phases, the metallic content of the 11th portion was reextracted into an aqueous phase and diluted with water to 5 ml. For analysis of the aqueous product phase, the metallic content of the eleventh portion was precipitated by addition of ammonium hydroxide. The separated precipitate was dissolved in hydrochloric acid and diluted with water to 5 ml. For analysis of feed, one portion of feed was diluted with water to 5 ml.

Each 0.40-ml. portion of feed was found to have the following analysis: Y—3.5 mg.; La—5.95 mg.; Pr—9.8 mg.; Gd—8.75 mg., Dy—9.8 mg.; Ho—10.85 mg.; and Er—9.8 mg.

In the table below are the analytical results of the separation of yttrium from the rare earths.

|  | Percent yield Y | Ratio, by mass, of M to Y | | | | | |
| --- | --- | --- | --- | --- | --- | --- | --- |
|  |  | La/Y | Pr/Y | Gd/Y | Dy/Y | Ho/Y | Er/Y |
| Feed |  | 1.7 | 2.8 | 2.5 | 2.8 | 3.1 | 2.8 |
| Org. prod | 33 | 4.0 | 8.0 | 7.0 | 8.0 | 8.8 | 8.0 |
| Aq. prod | 66 | 0.5 | 0.2 | 0.3 | 0.2 | 0.2 | 0.2 |

It can be seen from the table above that the aqueous product contained 66 percent of the initial yttrium decontaminated from lanthanum by a factor greater than 3 and from the other rare earths by a factor greater than 8.

It will be understood that the invention is not to be limited by the details given herein but that it may be modified within the scope of the appended claims.

The embodiments of the invention in which an exclusive property or privilege is claimed are defined as follows:

1. A process for separating yttrium values from a mixture containing yttrium values together with lanthanide rare earth values comprising: dissolving said mixture in an aqueous solution of hydrogen bromide, adjusting said feed solution to contain no more than 2 M hydrogen bromide, adjusting the bromide ion content of said solution to 11.0 to 11.9 M, thus forming a feed solution, contacting said feed solution with DEH[ClMP] in a water-immiscible hydrocarbon solvent as an extractant whereby the major portion of the lanthanide rare earths and some yttrium values are taken up by the extractant, contacting the organic extractant with an aqueous scrub solution containing hydrogen bromide and 11.0 to 11.9 M total bromide ion concentration, thereby scrubbing the yttrium values from the extractant, and separating the yttrium values from the aqueous scrub and aqueous feed solutions.

2. The process of claim 1 wherein the feed solution contains 0.1 to 2.0 M hydrogen bromide.

3. The process of claim 2 wherein the bromide ion content is adjusted by adding lithium bromide.

4. The process of claim 3 wherein said extractant contains 0.1 to 1.0 F DEH[ClMP].

5. The process of claim 4 wherein the water-immiscible hydrocarbon solvent is benzene.

6. The process of claim 5 wherein the aqueous and organic solutions are contacted at about 25° C.

7. A process for separating yttrium values from a mixture containing yttrium values together with lanthanide rare earth values in an extractive system comprising: dissolving said mixture in an aqueous solution of hydrogen bromide, adjusting said solution to contain no more than 2 M hydrogen bromide, adjusting the bromide ion content of said solution to 11.0 to 11.9 M, thus forming a feed solution, adding successive portions of said feed solution to successive portions of an aqueous scrub solution containing 0.1 to 2.0 M hydrogen bromide and 11.0 to 11.9 M in bromide ion, contacting said scrub and feed solution mixture with successive portions of DEH[ClMP] in a water-immiscible hydrocarbon as an organic extractant passing in one direction through said system while simultaneously contacting said successive portions of said organic extractant with successive portions of said feed solution, passing in the opposite direction through said system, whereby said yttrium values are contained in said scrub solution and said rare earth values are contained in said organic extractant, combining the successive portions of scrub solution and recovering said yttrium values therefrom.

8. The process of claim 7 wherein the feed solution contains 0.1 to 2.0 M hydrogen bromide.

9. The process of claim 8 wherein the bromide ion content is adjusted by adding lithium bromide.

10. The process of claim 9 wherein said extractant contains 0.1 to 1.0 F DEH[ClMP].

* * * * *